Dec. 10, 1935.   C. A. CAMPBELL   2,023,757
AIR BRAKE
Filed March 23, 1931   5 Sheets-Sheet 1
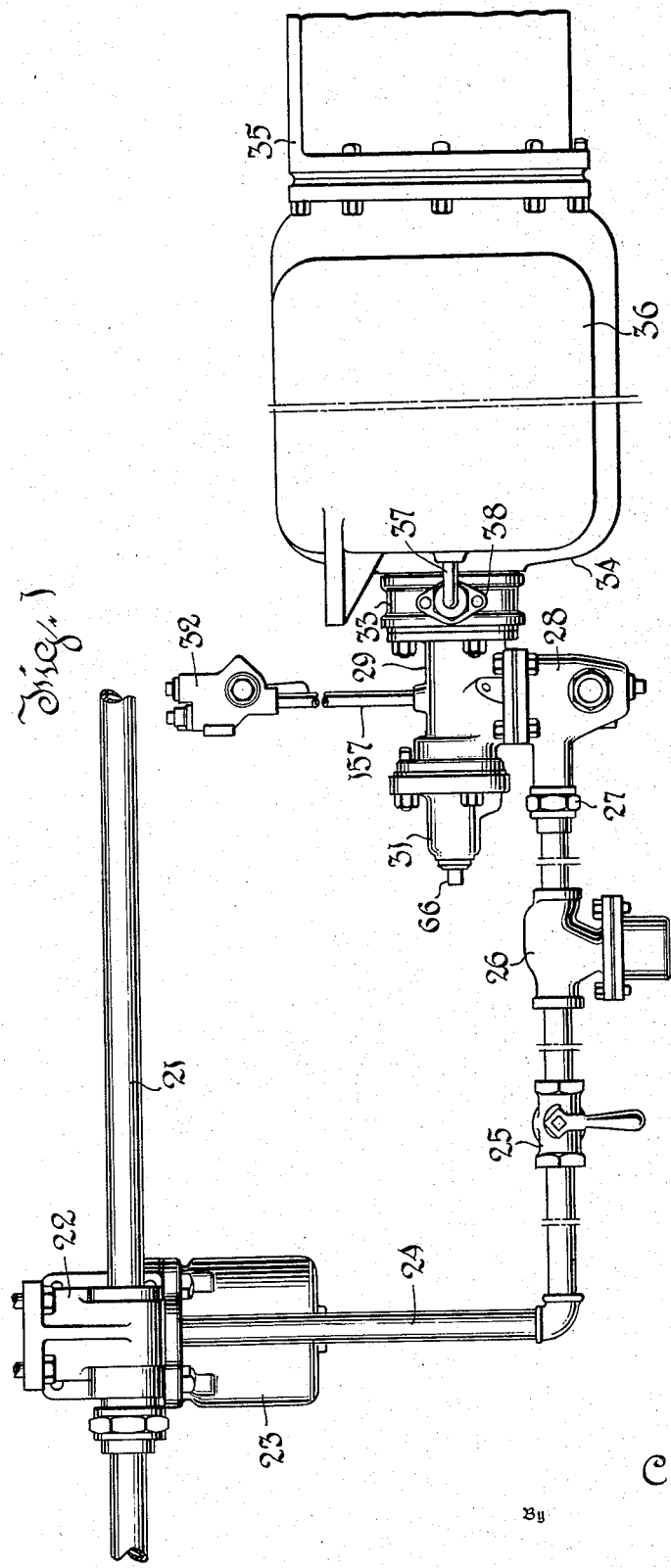
Inventor
Charles A. Campbell
By
Dodge and Sons
Attorneys Dec. 10, 1935.　　　　C. A. CAMPBELL　　　2,023,757
AIR BRAKE
Filed March 23, 1931　　　5 Sheets-Sheet 2
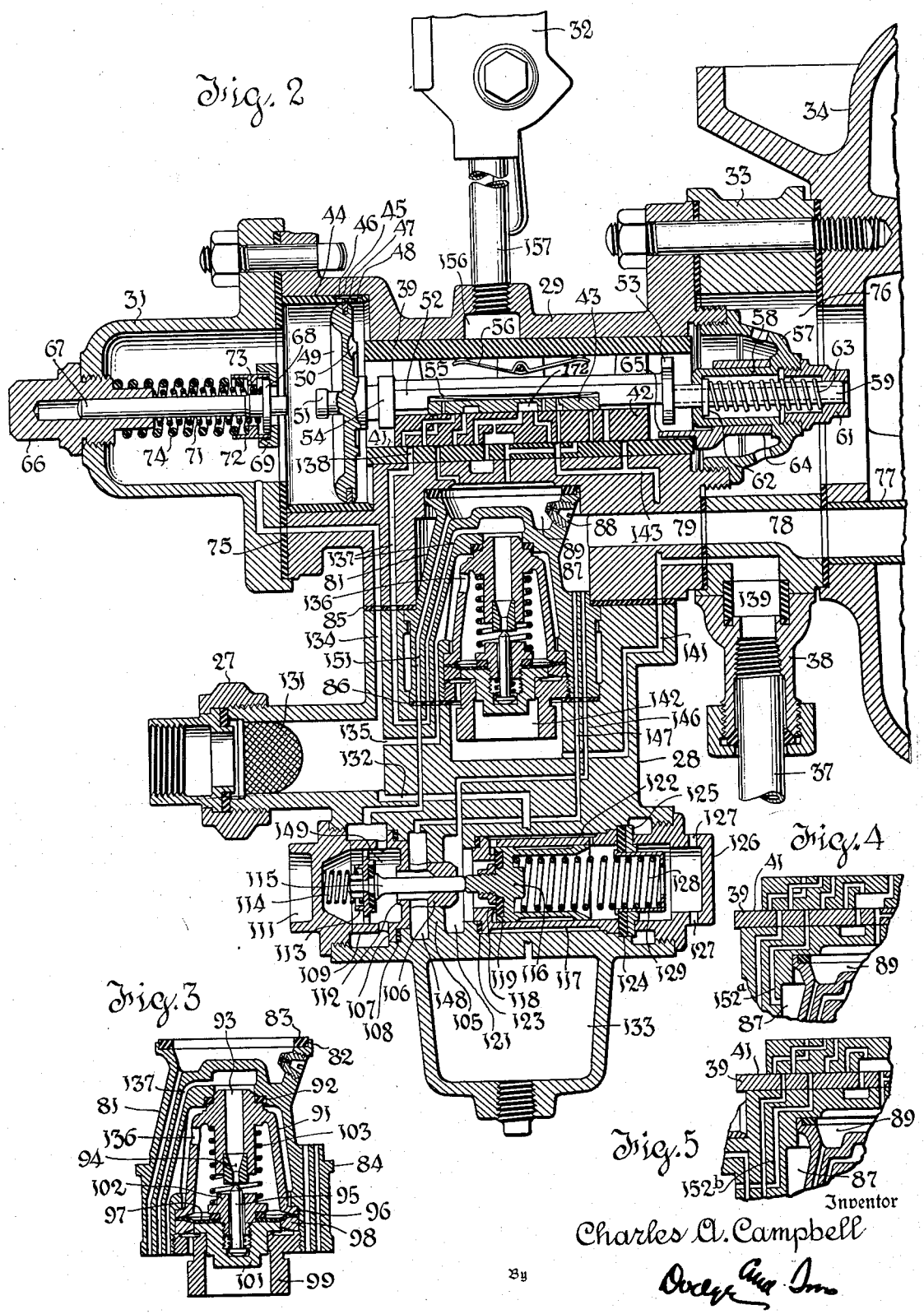
Inventor
Charles A. Campbell
By
Attorneys

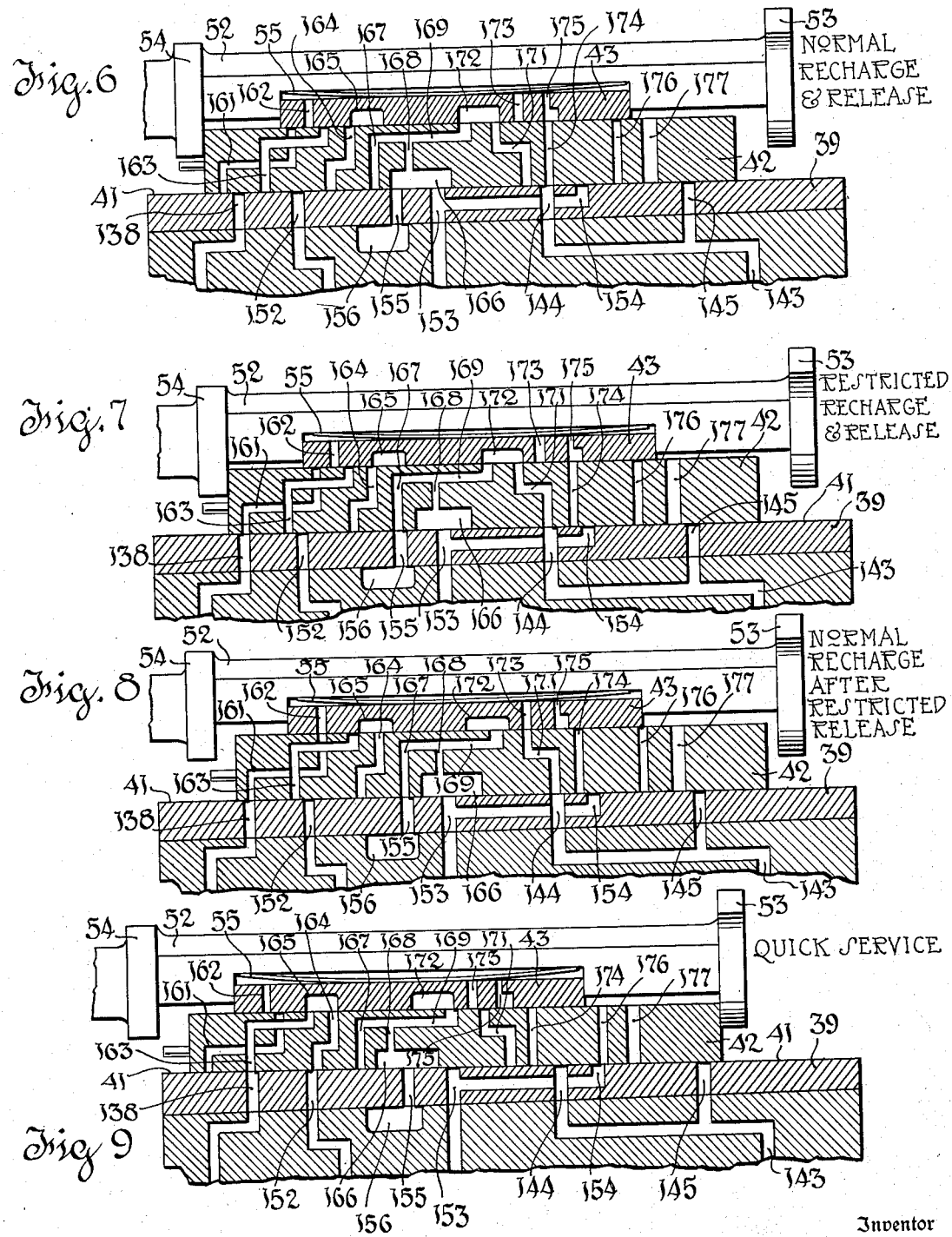

Dec. 10, 1935.  C. A. CAMPBELL  2,023,757
AIR BRAKE
Filed March 23, 1931   5 Sheets-Sheet 4
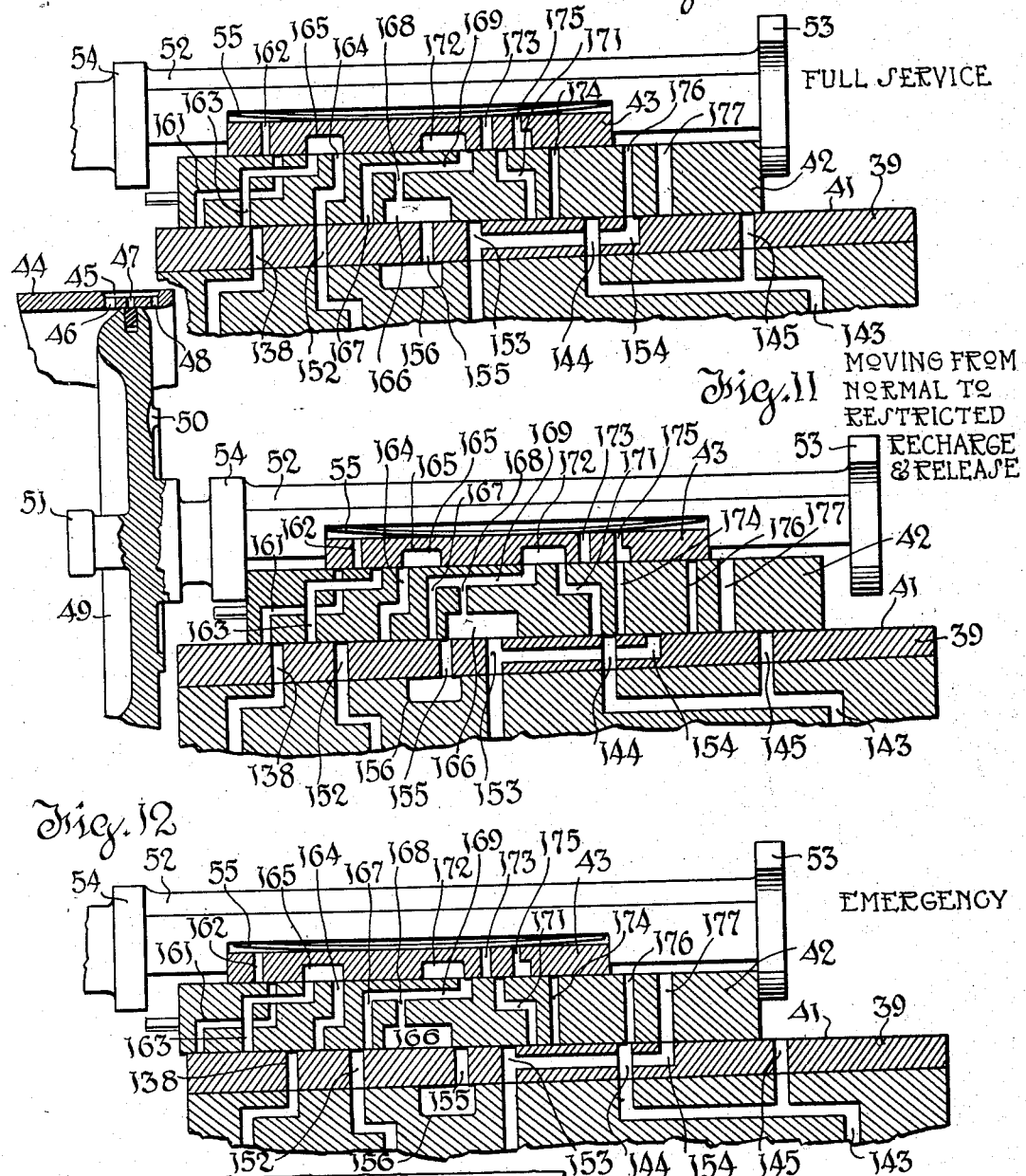
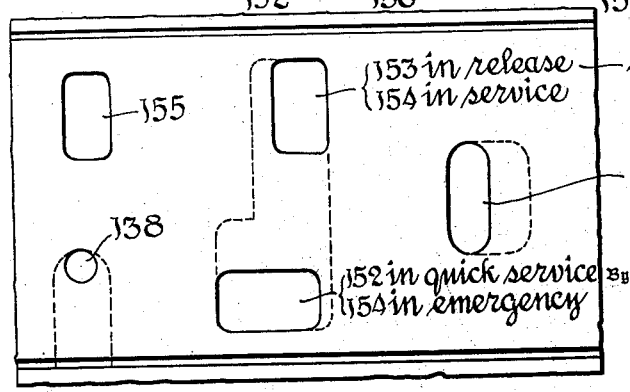
Inventor
Charles A. Campbell
Attorneys

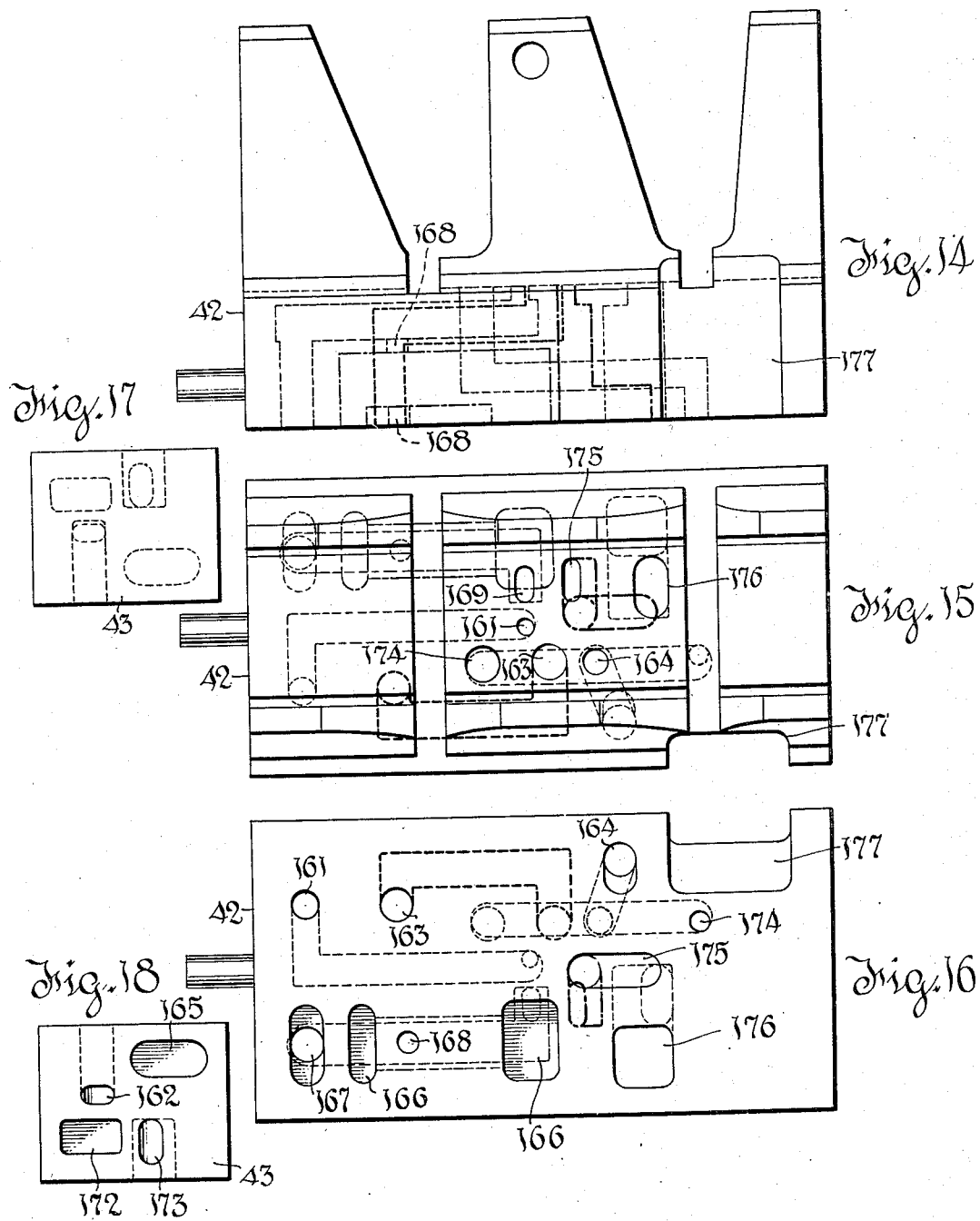

Patented Dec. 10, 1935

2,023,757

UNITED STATES PATENT OFFICE 2,023,757

AIR BRAKE

Charles A. Campbell, Watertown, N. Y., assignor to The New York Air Brake Company, a corporation of New Jersey Application March 23, 1931, Serial No. 524,740

50 Claims. (Cl. 303—36)

This invention relates to air brakes, and particularly to triple valves.

Certain features of the invention are useful both in that type of triple valve which uses a single auxiliary reservoir, and in those types which use more than one reservoir, while other features are useful only in connection with the multiple reservoir types.

For purposes of illustration, the invention will be hereinafter described as applied to a triple valve designed to supply the air from a single reservoir in service and from two reservoirs in emergency applications. The particular type of valve chosen for illustration does not function to vent the brake pipe in emergency, but is used in conjunction with a brake pipe vent valve, such a valve being associated as an independent structure with each triple valve. The invention, however, is not limited in this respect.

From the standpoint of the mechanical structure used, the most important feature of novelty disclosed in the present case is the use of a triple slide valve and a graduating valve in conjunction with a triple piston and a retard stop, in such a manner that after the triple piston and valves have moved to restricted recharge and release position, only the graduating valve and the piston move back to normal recharge position, leaving the triple slide valve in restricted release position.

The area of the graduating valve exposed to auxiliary reservoir pressure is so much less than the area of the triple slide valve that the frictional resistance to motion is far less. Consequently, the retard stop spring can be made lighter, thus permitting the valve to move to restricted release position more readily, and reducing its tendency to overtravel toward application position when returning to normal recharge position. From the standpoint of mechanical structure these are substantial advantages.

The peculiar motion of the slide valve and graduating valve, above defined, permits the introduction of certain valuable flow controls which are important objects of the invention as follows:

In normal release the back flow from the supplemental reservoir to the auxiliary reservoir is at a restricted rate which reduces the tendency toward reapplication and reduces the resistance to motion to restricted recharge and release. The broad idea of controlling such back flow by means of the triple valve and graduating valve is claimed in my Patent No. 1,928,091, granted September 26, 1933, as a continuation of an earlier filed application.

In motion from normal to restricted recharge and release positions, coordination of the charging passages around the triple piston and through the graduating and slide valves insures complete motion once motion is started.

In restricted recharge and release position the supplemental reservoir and the brake cylinder are connected to atmosphere through a single exhaust port which is controlled by the retainer valve. It has heretofore been proposed to connect the supplemental reservoir to the brake cylinder port in restricted release, but this is apt to have the effect of raising brake cylinder pressure. In the present invention the connection is to the exhaust passage beyond that restriction which controls the outflow of brake cylinder pressure, and the arrangement permits such proportioning of the parts as will secure the optimum restriction of brake cylinder exhaust without the possibility of increase of brake cylinder pressure. The broad idea of bleeding the supplemental reservoir in restricted release position is claimed in my Patent No. 1,928,091, granted September 26, 1933 above identified. In certain cases it is desirable to guard against this possibility. Under certain circumstances, however, the feature of venting the supplemental reservoir in restricted release may be omitted.

In normal recharge after restricted release (which is the name adopted for the position assumed by the parts when the graduating valve and piston move back to normal from restricted position, leaving the slide valve in abnormal position) a large port is opened between the auxiliary and the supplemental reservoir, the purpose being to dissipate any overcharge in the auxiliary reservoir into the supplemental reservoir. This action is peculiarly effective if the valve functions to vent the supplemental reservoir in restricted release position.

In this same position, a stabilizing port, which might conveniently be one of the quick service ports, is opened between the slide valve chamber and the brake pipe. In effect an additional by-pass is opened around the triple piston. Thus those triple valves which have moved to restricted release position, i. e., the valves on the forward end of the train, are rendered less sensitive to reductions of brake pipe pressure than they otherwise would be. It is exactly these forward triples which are most effected by erratic functioning of the feed valve on the locomotive, so that stabilization of the forward valves offers marked operating advantages.

By using one of the quick service ports as the stabilizing port, and by controlling this quick service port by means of the quick service limiting valve, forming the subject matter of a prior application Serial No. 517,606, filed February 21, 1931, it is possible to close the stabilizing by-pass and thus restore the sensitiveness of the triple valve when brake pipe pressure has been reduced a given amount. Consequently the quick service limiting valve acquires a new and useful function in this particular combination, and is here claimed in that relation. It may, however, be omitted as the stabilizing port will operate satisfactorily without it.

Another feature of the invention is that because the triple slide valve stays in restricted release position, after the triple piston moves back to normal recharge position, brake cylinder exhaust if once restricted, remains restricted until a new application is made.

Another feature of the invention is the use of a two-stage build-up valve controlling the rise of brake cylinder pressure both in service and in emergency. This valve functions to give a rapid initial rise of pressure, followed by a gradual rise. This valve will function to prevent too violent initial applications in the event that a triple valve should stick on the first brake pipe reduction and respond to a subsequent additional reduction, as will be hereinafter explained.

The two-stage build-up mechanism herein described is illustrated as typical of such multiple stage build-up mechanisms, any of which might be used. One such mechanism which gives a three-stage build-up and has developed decided valuable characteristics, is illustrated in my Patent No. 1,928,091, granted September 26, 1933.

A practical embodiment of the invention, as above outlined, is illustrated in the accompanying drawings, in which,—

Fig. 1 is a view showing the connection of the triple valve to the brake pipe, emergency vent valve, supplemental and auxiliary reservoirs, and brake cylinder.

Fig. 2 is a vertical axial section through a triple valve embodying the invention and showing the connections to the supplemental and auxiliary reservoirs and brake cylinder. In this view the structure is conventionalized to the extent that the various ports are drawn on the plane of section. In actual practice a more compact structure can be secured by a somewhat different location of ports.

Fig. 3 shows the quick service limiting valve which also acts as a limiting valve for the stabilizing port.

Fig. 4 is a fragmentary view showing a modification in which quick service air is fed directly to the brake cylinder uncontrolled by the two stage build-up mechanism.

Fig. 5 is a similar view showing a modification in which the quick service vent is directly to the atmosphere.

Fig. 6 is an enlarged sectional view of the triple slide valve and its seat and of the graduating valve, the parts being shown in normal recharge and release position.

Fig. 7 is a similar view showing the parts in restricted recharge and release position.

Fig. 8 shows the parts in the position called normal recharge after restricted release.

Fig. 9 shows the parts in quick service position.

Fig. 10 shows the parts in full service position.

Fig. 11 shows the parts moving from normal recharge and release to restricted recharge and release. In this view the triple piston and a portion of the cylinder bushing are shown to bring out the control of the charging flow.

Fig. 12 is a view similar to Figs. 6 to 10, inclusive, showing the parts in emergency (or over-reduction) position.

Fig. 13 is a plan view of the seat for the triple slide valve showing the actual porting, as contra-distinguished from the diagrammatic porting illustrated in Figs. 2 to 12 inclusive.

Figs. 14, 15 and 16 are respectively side elevation, plan, and lower face views of the triple slide valve as actually constructed.

Figs. 17 and 18 are respectively, top plan view, and lower face view, of the graduating valve as actually constructed.

Referring first to Fig. 1, a portion of the brake pipe is indicated at 21. This is connected from car to car by the usual brake pipe hose, and pressure in the brake pipe is controlled by an engineer's brake valve of any suitable type located in the locomotive.

Interposed in the brake pipe is a bracket fitting 22 which offers a connection for an emergency vent valve of the pipeless type, generally indicated by the reference numeral 23. This brake pipe vent valve may be of any preferred construction, but is preferably of that type which responds to a brake pipe reduction occurring at a rapid rate. When the valve responds it vents the brake pipe 21 directly to atmosphere.

The function of the vent valve is merely to propagate throughout the length of the brake pipe a sudden or emergency pressure reduction. Its response is wholly independent of the response of the triple valve.

Also connected to the bracket fitting 22, and communicating therethrough with the brake pipe 21, is the branch pipe 24. This communicates through a cut-out cock 25, centrifugal dust separator 26, and union 27, with the lower case or body 28 of a triple valve whose main body appears at 29. This triple valve has the usual front cap 31 and retainer 32 and is mounted against a filler piece 33 which in turn is seated on the head end of the auxiliary reservoir 34. The brake cylinder 35 is mounted on the forward end of the auxiliary reservoir 34. A supplemental reservoir is shown at 36 and is connected by the pipe 37 and fitting 38 with the filler piece 33. The purpose of the filler piece 33 is to afford a mount for the triple valve which will connect it with both reservoirs and the brake cylinder.

Refer now to Fig. 2. The body 29 is provided with the usual valve chamber bushing 39 which is formed with the usual flat valve seat 41 for the triple slide valve 42. The graduating valve 43 is slidable on top of the triple slide valve. The cylinder bushing 44 is of usual construction except that it is formed on its outer side with a groove 45 which serves to connect three feed ports, a relatively large port 46, and two smaller ports 47 and 48, whose total capacity approximates the capacity of the port 46, and whose individual capacities are in proportion to the volumes of the reservoirs 36 and 34.

The triple piston appears at 49 and has the usual bead with a narrow slot 50 which seats on the end of the slide valve bushing and determines the rate of restricted charging. There is the usual graduating button 51. The piston stem 52 has a guiding spider 53 at its end, and between this spider and a collar 54 the slide valve 42 has limited lost motion. The graduating valve 43 is closely confined in a notch in the stem 52 and is held seated by a bow-spring 55. A second bow-spring 56 seats the valve 42.

Threaded into the inner end of the body 29 is a ported member 57 which has a central hub 58 serving as a guide for the forward end of the retard stop 59. At the rear end the stop 59 is guided in a bushing 61 threaded into the member 57. It is limited in its forward motion by a flange or collar 62 and is urged forward by a relatively light coil spring 63 which surrounds the stem and is confined between the bushing 61 and the collar 62. Slidably mounted on the hub 58 is a sleeve 64 which carries a lug 65. This lug limits the inward motion of the slide valve 42.

The retard stop 59 coacts solely with the end of the stem 52. Consequently, at the end of restricted release and recharge it moves merely the piston stem 52, piston 49 and graduating valve 43, the slide valve 42 remaining unaffected in its innermost or restricted release position.

The front cap 31 has the usual plug 66 which serves as a guide for the graduating stem 67. This has near its forward end the usual collar 68 which seats on a stop 69 formed in the front cap. A light graduating spring 71 surrounds the stem 67 and is confined between the nut 66 and the collar 68. Also seated against the stop 69 is a ring 72 having an inward flange 73. This is engaged by the collar 68 when the stem 67 moves back slightly and then brings into action a second and heavier graduating spring 74 which is confined between a portion of the nut 66 and the inward flange 73 on ring 72.

The parts are so arranged that button 51 engages the end of stem 67 without compressing either spring in quick service position; compresses spring 71 until collar 68 engages flange 73 in full service position, and overpowers both springs until the piston 49 seats on the front cap gasket 75 in emergency and over-reduction position.

It will be observed that the guide member 57 projects into a port 76 formed through the member 33 and serving to connect the valve chamber within the bushing 29 with the interior of the auxiliary reservoir 34.

The brake cylinder pipe 77 which extends through the auxiliary reservoir 34 to the brake cylinder 35 (this being standard practice in the air brake art) communicates with a passage 78 in the member 33 which registers with the brake cylinder passage 79 in the body 29. The body 29 may be a standard body for an ordinary K-type triple valve now extensively used by North American railways. This body has in its lower portion a chamber, which in the K-triple valve is used for the emergency piston. This chamber, in conjunction with a registering chamber formed in the special lower case 28, is used to receive a quick service limiting valve body 81 (see also Fig. 3). This body is formed with a flange 82 to confine the ring gasket 83 which forms a seal between the upper end of the body 81 and the upper end of the recess in the body 29. At about midlength there is an annular flange 84 which seats in a countersink in the lower body 28 and which seals against the gasket 85 interposed between the lower case 28 and the triple valve body 29. The lower end of the body 84 seats on an annular ported gasket 86 and thus seals with the lower end of the recess in the lower case 28.

The brake cylinder passage 79 communicates with an annular passage 87 which surrounds the upper portion of the body 81 and communicates through an interchangeable choke 88 with a space 89. The choke 88 controls the rate of flow of air to the brake cylinder in the second stage of emergency and is made interchangeable so that different chokes may be substituted and the rate of flow in the second stage set to any desired value.

The body 81 is in the form of an inverted cup and inserted through its lower end is a member 91. (Refer particularly to Fig. 3.) This makes a tight joint by means of the gasket 92, with the body 81 and has a central passage 93 leading from the ported valve seat 94 for the pin valve 95. The lower end of the member 91 is formed with a convex seat 96 for a flexible diaphragm 97. A convex diaphragm clamping ring 98 forms a seat for the lower side of the diaphragm 97 and is held in place by a ported annular nut 99. The pin valve 95 is seated in a central hub made up of a thrust member 101 and a nut 102 threaded into the member 101 through the center of the diaphragm. The member 101 also coacts with the nut 99 to limit downward motion of the diaphragm.

The pin valve 95 is shown as of a construction familiar in governor tops and feed valves, but may be of any suitable type in which the pin valve is free to aline itself with the seat 94. A coiled compression spring 103 is confined between the members 91 and 102 and acts to urge the diaphragm 97 downward, that is, in a valve opening direction.

The brake cylinder build-up delay mechanism is located in the lower part of the lower case 28. In Fig. 2 it is shown with its axis parallel with the axis of the valve chamber bushing 39, but in the valve as customarily constructed, a more compact arrangement, and greater accessibility can be secured, by locating the axis at right angles to the axis of the bushing 39. This arrangement is suggested in Fig. 1.

The delay valve mechanism is mounted in two alined bores separated by a partition 105. Inserted from one side is a bushing structure having a hub portion 106 which projects through 105 and fills an opening in the partition 105, the flange 107 which seats on a gasket 108, and a ported cup-like portion 109 which is engaged and held inward by the plug 111. The plug 111 is threaded into and closes the opening in the body 28.

On the hub portion 106 is formed a seat 112 for the cut-off valve 113. This is urged in a closing direction by the coiled compression spring 114 and is guided by a stem 115, which is longitudinally slidable in the bushing 106.

Under release conditions, and in the first stages of an application, the valve 113 is held open by a piston 116, which, in its inward position, engages the stem 115 of valve 113. The piston 116 slides in a bushing 117 which has at its inner end a rim 118. The piston 116 carries at its inner end a gasket 119 which seats against the rim 118 so that when the piston 116 is in its inner position a relatively small area of the piston is subject to pressure in the chamber 121.

There is a bridging port 122 formed through and around the bushing 117 from the annular space outside the rim 118 to the space to the right of the piston 116. This port is closed by the initial movement of the piston 116 outward. The bushing is sealed to the lower case 28 at its inner end by a gasket 123, and at its outer end by a gasket 124. This gasket is compressed by a thrust ring 125, which in turn is engaged by the plug 126 screwed into the body 28. The nut 126 is ported at 127 so that the piston 116 is always subject, on its right hand side, to atmospheric pressure. It is urged inward by a coiled compression spring 128 which is confined between the inner end of the piston 116 and an annular spring seat 129 sustained by the gasket 124 and ring 125.

The purpose of the construction illustrated is to permit the use of a relatively long spring 128 so that the resistance of the spring 128 will not build up with undue rapidity, as the piston 116 moves outward. The construction is such that as pressure in the chamber 121 builds up, a value will be reached at which the piston 116 starts to overpower spring 128. Initial movement of the piston outward increases the effective area of the piston subject to pressure in the chamber 121, and almost simultaneously closes the port 122. Consequently, the piston 116 moves to its extreme right hand position in which it seats against the gasket 124. Since the piston seats on the gasket in each limiting position and moves rapidly between these two positions, it is not essential that the piston 116 fit closely in the bushing 117. A good sliding fit is all that is necessary.

Branch pipe 24 communicates through the union 27 and strainer 131 with three passages. Of these, passage 132 leads to a drain cup 133; passage 134 leads to the space to the left of the triple piston 49; and passage 135 leads to the space outside the member 91, and thence through the opening 136 to the space above the diaphragm 97. When the valve 95 is unseated this space is in communication through the seat 94 and bore 93 with the passage 137 which leads through the members 81, 28 and 29 to the quick service port 138 on the slide valve seat.

From the space 139 with which the supplemental reservoir pipe 37 communicates, there is a passage 141 which leads to the space 142 beneath the diaphragm 97. There is also a passage 143 which connects with the supplemental reservoir ports 144 and 145 in the slide valve seat.

There are two passages 146 and 147 which connect the space 121 to the right of the partition 105 and the space 148 to the left of the partition, respectively, with the chamber 87 which is in communication with the brake cylinder pipe 79. Thus the spaces 148 and 121 on opposite sides of the partition 105 are both at brake cylinder pressure, the function of the partition being to prevent air rushing through the valve seat 112 from impinging directly on the end of the piston 116.

It is not essential that the valve stem 115 have a particularly close fit in the hub 106.

The space 89 is in communication with the space 149 to the left of the valve seat 112 by way of a passage 151 formed partly in the insert 81 and partly in the lower case 28 and body 29. The space 89 is in direct communication with three ports in the slide valve seat 41; a quick service port 152; a port 153 for exhaust flow; and a port 154 for service and emergency flow. There is an exhaust port 155 which communicates by way of the annular passage 156 with the retainer pipe 157.

Two possible alternative arrangements of the quick service port 152 are indicated in Figs. 4 and 5, respectively. In Fig. 4, the port 152a leads to the space 87 instead of to the space 89. In this, as in the preferred form, the ultimate flow is to the brake cylinder, but in Fig. 4 this flow is not controlled by the valve 113, as it is in the arrangment of Fig. 2.

In Fig. 5, the port 152b leads to atmosphere so that the quick service venting will occur directly to the atmosphere, instead of to the brake cylinder.

The slide valve 42 is ported as follows: There is a stabilizing port 161. In restricted recharge and release this registers with the quick service port 138, but at that time is blanked by the graduating valve 43. In normal recharge after restricted release a port 162 in the graduating valve registers with the upper end of port 161 and connects the slide valve chamber with the brake pipe under control of the pin valve 95. There are two quick service ports 163 and 164 which register with the quick service ports 138 and 152 in quick service position and are then bridged by the recess 165 in the graduating valve. These ports are devoid of function in other positions.

There is an exhaust recess 166 in the slide valve which in normal release position connects the ports 153 and 155. In restricted recharge and release position and in normal recharge after restricted release, port 167 registers with port 155, and port 166 with port 153. Ports 166 and 167 are connected by a restricted passage 168 which, in the positions of Figs. 7 and 8, restricts the release flow from the brake cylinder.

The port 167 has an extension 169 which leads to the upper face of the slide valve. There is a supplemental reservoir port 171 which extends through the slide valve from top to bottom. In restricted release and recharge position the port 171 registers with port 144 and is connected with port 169 by means of recess 172 in the graduating valve.

When the graduating valve 43 moves back from the restricted release and recharge position of Fig. 7 to normal recharge after restricted release (Fig. 8), the recess 172 moves out of register with the port 171, and port 173 of large capacity formed in the graduating valve connects port 171 with the slide valve chamber. Port 174 extends through the slide valve 42 from top to bottom and, in normal release position, registers with port 144 and with a throttling port 175 in the graduating valve 43. These ports do not function in other positions of the valve.

There is a through port 176 which extends from top to bottom of the slide valve 42, and is controlled by the graduating valve 43. This is the service port. In quick service position (Fig. 9) it is cleared by the graduating valve and is just starting to register with port 154. In full service position (Fig. 10) it is still exposed and in full register with port 154, while in service lap position (not shown) the graduating valve 43 has moved back to lap the port 176, the slide valve 42 remaining at rest.

There is an emergency port 177 which extends through the slide valve 42 from top to bottom and is not controlled by the graduating valve. In emergency position (Fig. 12) this registers with the port 154.

The actual porting of the seat 41 and the valves 42 and 43 differs from that shown in the diagrams in that in the actual structure certain of the ports perform functions shown in the diagram as performed by two distinct ports.

Before attempting to describe the actual porting, the functions of the valves and the various characteristic flows will be described. With these functions clearly in mind, it will be relatively simple to understand the actual construction of the slide and graduating valves.

OPERATION

*Release. (General considerations.)*

Assuming that a service application has been made, the engineer moves his brake valve first to release to produce a rapid rise of brake pipe pressure and shift all the triple valves, and then to running position in which the brake pipe is fed through a pressure-limiting feed valve. The pressure rise will be relatively sharp on the forward end of the train. Consequently the triple valves on the forward cars will move to restricted release position (Fig. 7) and those on the rear cars will move to normal release position (Fig. 6).

*Normal recharge and release*

On the rear cars the rise of brake pipe pressure will be gradual and the triple valves will be shifted to normal release position (Fig. 6). It has been assumed that the release follows a service application. Consequently, the pressure in the auxiliary reservoir 34, which alone fed air to the brake cylinder, will be reduced, while pressure in the supplemental reservoir 36 will be at the normal value.

When the slide valve and graduating valve reach the position of Fig. 6, air from the supplemental reservoir 36 will start flowing to the valve chamber by way of pipe 37, passage 143, ports 144, 174 and 175. Inasmuch as port 175 is restricted, the back flow from the supplemental reservoir will be slow, and, consequently, will not build up pressure in the auxiliary reservoir faster than brake pipe pressure is rising. Hence, there will be no tendency for the triple valves to move toward service or quick service position. This tendency would exist in a marked degree except for the throttling action of the port 175.

The triple piston 49 stands between the port 46 and the port 47 so that the normal charging rate from the brake pipe to the auxiliary reservoir exists. It will be understood that after pressures in the auxiliary reservoir 34 and supplemental reservoir 36 have equalized, the two reservoirs will be charged to normal pressure at the same time. This implies an ultimate reversal of flow through the passage 143. The brake cylinder is exhausted through port 153, recess 166 and port 155. Valve 113, if closed, will open against the resistance of light spring 114.

*Restricted recharge and release*

On the forward cars the rise of brake pipe pressure is much more rapid. On the cars very near the locomotive the brake pipe pressure acting on piston 49 will readily overpower spring 63, moving the piston inward until it seats against the end of bushing 39 at which time the slot 50 determines the charging rate.

The farther the car is from the locomotive the less pronounced is the brake pipe pressure rise, and a point will be reached where the triple pistons start to move toward restricted release position and have a tendency to falter and stop before they get there. The arrangement of the ports 46, 47 and 48 virtually eliminates this faltering tendency, and this may best be explained with reference to Fig. 11.

The initial motion of the piston 49 blanks port 47 and from then on the rate of charging flow is limited to the capacity of the port 48. The capacities of the ports 47 and 48 are approximately proportional to the volumes of the reservoirs 36 and 34, respectively, so that the initial movement of the piston from normal recharge position cuts down the rate of charging flow and thus checks the flow from the brake pipe and conserves brake pipe pressure.

This same initial motion carries the port 174 out of register with port 144 and stops the charging flow to the supplemental reservoir (after emergency) or (after service) prevents any back flow from the supplemental reservoir.

The effect of initial motion of the valve toward restricted release position is, consequently, such as to insure a completion of motion to restricted release, at which time charging flow is limited to the capacity of the groove 50.

Restricted recharge and release position is shown in Fig. 7. In this position the valve chamber is cut off from the supplemental reservoir ports 144 and 145 and the supplemental reservoir 144 is connected by port 171, recess 172, extension 169, port 167, with the exhaust port 155 so that if the retainer valve 32 is open, the supplemental reservoir is vented directly to atmosphere. In some cases such venting of the supplemental reservoir is not desired, and in such case, the recess 172 and extension port 169 are omitted. The brake cylinder is exhausted through ports 153, cavity 166, restriction 168, port 167 and port 155.

*Normal recharge after restricted release*

When brake pipe and auxiliary reservoir pressures approach equalization, the retard stop spring 63 will restore the piston 49 to its normal position. This will shift valve 43, but not valve 42, so that the parts will assume the position of Fig. 8, normal recharge after restricted release. The recharge rate around the piston 49 will be restored to the maximum capacity of the port 46.

The valve 42 will remain in its abnormal position in which brake cylinder exhaust is still throttled, so that any remaining air will be discharged from the brake cylinder through port 153, recess 166, restriction 168 and ports 167 and 155. The relatively large port 173 in the graduating valve will now register with the port 171 in the slide valve which in turn is in register with the supplemental reservoir port 144.

Consequently, the slide valve chamber and the supplemental reservoir are in free communication with each other, and any overcharge in the auxiliary reservoir will be quickly dissipated into the supplemental reservoir. This action will be more pronounced if pressure fluid is bled from the supplemental reservoir in restricted recharge and release, but even if the supplemental reservoir is not vented, there will be a partial dissipation of the excess pressure in the auxiliary reservoir. In this position the stabilizing port 161 is in register with the quick service port 138 and the stabilizing port 162 in the graduating valve registers with the stabilizing port 161 so that a passage is open from the slide valve chamber directly to the brake pipe by way of ports 162, 161, 138, passage 137, bore 93, opening 36, passage 135. Thus minor reductions of brake pipe pressure, such as might be caused by an erratic feed valve, will not cause undesired application of the brakes. As pointed out, the triple valves on the forward cars are the only ones thus stabilized.

The strength of the spring 103 is such that if brake pipe pressure is a definite amount below supplemental reservoir pressure, say for example, six pounds per square inch, the valve 95 will close. While the valve 95 was primarily devised to limit quick service venting, it also performs the function of closing the stabilizing port as soon as a definite reduction of brake pipe pressure has been made. Consequently, in the present relation the quick service limiting valve which was described in my prior application above-identified, performs a new and additional function.

Experience with this valve has shown that the stabilizing ports can be made large enough to dissipate any ordinary overcharge in the supplemental reservoir, thus serving the double purpose of preventing undesired reapplications and assisting in the recharge of the brake pipe.

*Quick service*

In quick service position the graduating button 51 has just engaged the graduating stem 67 and the parts are in the position shown in Fig. 9. The service port 176 is just starting to register with port 154, while ports 163 and 164 are in register with ports 138 and 152 and are bridged by recess 165 in the graduating valve. This permits brake pipe air to flow by way of passage 135, opening 136 and bore 93, passage 137, ports 138, 163, 165, 164, 152 to chamber 89. This venting will continue until brake pipe pressure has dropped a definite amount, here assumed to be six pounds below supplemental reservoir pressure, at which time valve 95 will close and terminate the venting flow. With the valve as ordinarily constructed, valve 95 will close before piston 116 moves and permits valve 113 to close.

Consequently, quick service venting into the space 89 is virtually the same as quick service venting into the space 87. If it is desired to place this venting definitely beyond interference by valve 113, the arrangement shown in Fig. 4 may be adopted, in which the quick service port 152a discharges directly into the space 87, or if it is desired to discharge the air vented in quick service directly to atmosphere, the arrangement shown in Fig. 5 may be adopted in which the quick service port 152b leads to atmosphere.

Quick service venting accelerates the propagation of the service pressure reduction throughout the train, and hastens the response of the triple valve.

*Full service*

Full service position is illustrated in Fig. 10. In this position the quick service ports are out of register, and the service port 176 is in full register with the port 154. This allows flow from the auxiliary reservoir alone to the brake cylinder by way of space 89, passage 151, through valve seat 112, chamber 148, and thence by port 147 and space 87 to the brake cylinder passage 79, extension 78 and brake cylinder pipe 77.

The rising brake cylinder pressure in chamber 87 is communicated by way of port 146 to chamber 121. When it reaches a value determined by the exposed area of the piston 116 and the strength of the spring 128, the piston 116 will start to move to the right. It will be assumed that the piston starts to move when brake cylinder pressure reaches a value of fifteen pounds per square inch, though other values may be adopted.

The initial movement closes the port 122 and exposes the entire area of the piston 116 to brake cylinder pressure so that the piston moves outward to its limit of motion and seats against the gasket 124. The effect is to permit valve 113 to close under the urge of spring 114 and pressure in the chamber 89. From then on the flow from the chamber 89 of the brake cylinder is limited to the capacity of the choke 88.

*Emergency*

In the event that brake pipe pressure is reduced at a rate more rapid than service reduction rate, the emergency vent valve 23 will function and vent the brake pipe. The piston 49 will move outward and seat on gasket 75 and the valve will assume the position shown in Fig. 12. In this position supplemental reservoir air will be delivered to the slide valve chamber through port 145 which is then fully exposed, so that supplemental reservoir air and auxiliary reservoir air will both flow to chamber 89 by way of ports 177 and 154.

From chamber 89 the flow to the brake cylinder will be that already described with reference to full service. The fifteen pounds brake cylinder pressure necessary to cause closure of the valve 113 will be attained somewhat more rapidly and the flow through the choke 88 will be more rapid because port 177 is substantially larger than port 176 and because the volume of the supplemental reservoir 36 is added to the auxiliary reservoir volume.

*Actual porting of valves*

The operation of the valves has now been traced from the diagrammatic standpoint, and while it is entirely practicable to construct the valves with all the ports shown in the diagram, it is possible to simplify the construction by causing certain of the ports to perform double functions.

Figs. 13 to 18 inclusive show preferred porting and the structure shown in these figures is functionally identical with that shown in the remaining figures, except Figs. 4 and 5, in which, as explained, the discharge port for quick service venting is modified. Wherever the ports in Figs. 13 to 18 are identical in function with similarly numbered ports in the remaining figures, they are given the same reference numerals.

Referring first to Fig. 13, there is a single supplemental reservoir port indicated by the legend "144 in all release positions, 145 in emergency". Instead of three ports 152, 153 and 154 leading to the chamber 89, there are two ports, one corresponding to port 152 and the other to port 153, and each of them performing a portion of the service performed by the port 154. Consequently, one port bears the legend "153 in release, 154 in service", and the other bears the legend "152 in quick service, 154 in emergency".

The ports 135 and 155 correspond to similarly numbered ports in the diagram.

On the slide valve 42 the ports are numbered similarly to the diagram. It should be noted that the emergency port 177 takes the form of a notch cut in the side of the slide valve. Many of the remaining ports are produced by drilling and plugging, but as illustration of this would be confusing, the general path of the ports has alone been traced.

In Figs. 14 and 16 the port 168 is shown as drilled through from the lower face of the valve, and open to said lower face. It is blanked on the seat in all positions except service and quick service, where it registers merely with exhaust port 155. It then establishes atmospheric pressure in the ports 166 and 167, and by thus increasing the seating pressure on the valve increases its frictional resistance to motion.

It will be observed that the graduating valve 43 contains no port corresponding to the port 175. The edge of the graduating valve 43 coacts with the port 174 in the slide valve 42 to perform the desired function.

The porting described in Figs. 13 to 18, inclusive, affords a simple and compact arrangement and the best so far developed, but is by no means the only arrangement which might be adopted to embody the principles shown in diagram in Figs. 6 to 12, inclusive.

As already explained, certain features of the invention may be embodied in triple valves differing from that illustrated. For example, it is not essential that a separate brake pipe vent valve always be used; it is not essential to every aspect of the invention that a two-stage build-up mechanism, or any stage build-up mechanism, be used to control service or emergency applications, or both. Various multiple stage mechanisms are used and might be adapted to use with triple slide valves ported to embody the invention here disclosed, or certain features thereof.

The idea of connecting the brake pipe to the slide valve chamber in normal recharge following restricted release may be adopted whether or not a supplemental reservoir is used, and if a supplemental reservoir is used, whether or not this reservoir is vented in restricted release position.

The feature of providing for differential flow rate between the supplemental and auxiliary reservoirs in normal release and recharge position and in normal recharge following restricted release is useful, irrespective of the presence or absence of the stabilizing connection between the supplemental reservoir and the brake pipe in normal recharge following restricted release.

The use of a quick service port controlled by a quick service limiting valve as a part of the stabilizing connection in normal recharge following restricted release is a convenient and highly desirable arrangement. The same arrangement could be used whether this stabilizing port has or has not a quick service function. In such case, control by a diaphragm valve, such as the valve 95, might be dispensed with, or might be exerted by other approximately equivalent mechanism.

In other words, the mechanism here disclosed involves a number of useful features, various of which are individually useful, and all or many of which in combination produce advantageous results. Consequently, no necessary limitation to the exact structure herein disclosed is implied.

I claim:

1. The combination of a brake pipe; a reservoir; a brake controlling valve device including a valve actuating abutment interposed between the brake pipe and reservoir and arranged to respond to differentials between the pressures therein, said device having a normal and an abnormal release position in each of which it affords a path for flow between the brake pipe and the reservoir; and means rendered effective by motion of said valve device to said abnormal and then to said normal position to afford an additional flow path between said brake pipe and reservoir.

2. The combination with an automatic brake valve of the type including an actuating piston and having a normal charging position and an abnormal charging position to which last the valve is moved by excessive brake pipe pressure, of means comprising ports in the automatic valve rendered effective by motion of the automatic valve to said abnormal and back to said normal position to open a by-pass around said actuating piston.

3. The combination with an automatic brake valve of the type including an actuating piston and having a normal charging position and an abnormal charging position to which last the valve is moved by excessive brake pipe pressure, of means rendered effective by motion of the triple valve to said abnormal and back to said normal position to open a by-pass around said actuating piston; and means independent of the automatic valve and responsive to a low brake pipe pressure for closing said by-pass.

4. The combination with an automatic brake valve of the type having a normal charging position and an abnormal charging position, to which last the valve is moved by excessive brake pipe pressure, said valve being adapted to control charging of, and supply of air from, an auxiliary reservoir and a supplemental reservoir; means controlled by said automatic valve for connecting said reservoirs in normal charging position; and means rendered effective by the motion of the automatic valve to abnormal and back to normal charging position to change the flow capacity of the connection between the reservoirs.

5. The combination with an automatic brake valve of the type having a normal charging position and an abnormal charging position, to which last the valve is moved by excessive brake pipe pressure, said valve being adapted to control charging of, and supply of air from, an auxiliary reservoir and a supplemental reservoir; means controlled by said automatic valve for connecting said reservoirs in normal charging position; means rendered effective by the motion of the automatic valve to abnormal and back to normal charging position to change the flow capacity of the connection between the reservoirs; and means rendered effective by such motion to reduce the sensitiveness of said automatic valve to fluctuations of brake pipe pressure.

6. The combination with a triple valve of the type having a normal charging position and an abnormal charging position, to which last the valve is moved by excessive brake pipe pressure, said valve being adapted to control charging of, and supply of air from, an auxiliary reservoir and a supplemental reservoir, said valve including a triple piston; means controlled by said triple valve for connecting said reservoirs in normal charging position; and means rendered effective by the motion of the triple valve to abnormal and back to normal charging position to change the flow capacity of the connection between the reservoirs, and to open a by-pass around said triple piston.

7. The combination with a triple valve of the type having a normal charging position and an abnormal charging position, to which last the valve is moved by excessive brake pipe pressure, said valve being adapted to control charging of, and supply of air from, an auxiliary reservoir and a supplemental reservoir, said valve including a triple piston; means controlled by said triple valve for connecting said reservoirs in normal charging position; means rendered effective by the motion of the triple valve to abnormal and back to normal charging position to change the flow capacity of the connection between the reservoirs, and to open a by-pass around said triple piston; and means independent of the triple valve and responsive to a low brake pipe pressure for closing said by-pass.

8. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; there being coacting ports in said seat and slide valve, and controlled by said graduating valve, said ports being so arranged as to open, in the last-named position, a passage from the slide valve chamber to the brake pipe.

9. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; there being coacting ports in said seat and slide valve, and controlled by said graduating valve, said ports being so arranged as to open, in the last-named position, a passage from the slide valve chamber to the brake pipe; and secondary valve means responsive to brake pipe pressure and controlling the last-named passage.

10. In an automatic brake valve, the combination of a slide valve chamber having a slide valve seat; a slide valve on said seat; a graduating valve; an actuating piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber, and when the graduating valve is in normal and the slide valve in abnormal position to open free communication between said slide valve chamber and said supplemental reservoir.

11. In an automatic brake valve, the combination of a slide valve chamber having a slide valve seat; a slide valve on said seat; a graduating valve; an actuating piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position, an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber, and when the graduating valve is in normal and the slide valve in abnormal position to open free communication between said slide valve chamber and said supplemental reservoir and open a passage from the slide valve chamber to the brake pipe.

12. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber, and when the graduating valve is in normal and the slide valve in abnormal position to open free communication between said slide valve chamber and said supplemental reservoir and open a passage from the slide valve chamber to the brake pipe; and secondary valve means responsive to brake pipe pressure and controlling the last-named passage.

13. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber, and when the graduating valve is in normal and the slide valve in abnormal position to open free communication between said slide valve chamber and said supplemental reservoir and open a passage from the slide valve chamber to the brake pipe; secondary valve means controlling the last-named passage; a pressure motor connected to actuate said secondary valve means and subject to brake pipe pressure in a valve-opening direction and to supplemental reservoir pressure in a valve-closing direction; and means for biasing said secondary valve means in an opening direction.

14. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber, and when the graduating valve is in normal and the slide valve in abnormal position to open free communication between said slide valve chamber and supplemental reservoir and open a passage from the slide valve chamber to the brake pipe; secondary valve means controlling the last-named passage; a pressure motor connected to actuate said secondary valve means and subject to brake pipe pressure in a valve-opening direction and to supplemental reservoir pressure in a valve-closing direction; and a spring urging said secondary valve means in an opening direction.

15. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber and vent said reservoir, and when the graduating valve is in normal and the slide valve in abnormal position to open free communication between said slide valve chamber and said supplemental reservoir.

16. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber and vent said reservoir, and when the graduating valve is in normal and the slide valve in abnormal position to open free communication between said slide valve chamber and said supplemental reservoir, and open a passage from the slide valve chamber to the brake pipe.

17. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber and vent said reservoir, and when the graduating valve is in normal and the slide valve in abnormal position to open free communication between said slide valve chamber and said supplemental reservoir, and open a passage from the slide valve chamber to the brake pipe; and secondary valve means responsive to brake pipe pressure and controlling the last-named passage.

18. In a triple valve, the combination of a slide valve chamber having a slide valve seat; a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber and vent said reservoir, and when the graduating valve is in normal and the slide valve in abnormal position to open free communication between said slide valve chamber and said supplemental reservoir, and open a passage from the slide valve chamber to the brake pipe; a secondary valve means controlling the last-named passage; a pressure motor connected to actuate said secondary valve means and subject to brake pipe pressure in a valve-opening direction and to supplemental reservoir pressure in a valve-closing direction; and means for biasing said secondary valve means in an opening direction.

19. In a triple valve, the combination of a slide valve chamber having a slide valve seat, a slide valve on said seat; a graduating valve; a triple piston subject on one side to brake pipe pressure and on the other to pressure in said slide valve chamber, said piston being arranged to actuate said valves and having lost motion relatively to said slide valve; a yielding retard stop reacting against motion of the piston and serving when brake pipe pressure is normal to arrest the piston and valves in normal position, but capable of yielding under abnormal rise of brake pipe pressure to permit the piston and valves to move to an abnormal position, and thereafter serving to restore the piston and graduating valve to normal position while the slide valve remains in abnormal position; an auxiliary reservoir connected with said slide valve chamber; a supplemental reservoir; there being coacting ports in said seat and slide valve, controlled by said graduating valve, and serving when both valves are in normal position to open a restricted communication between the slide valve chamber and the supplemental reservoir, when both valves are in abnormal position to isolate the supplemental reservoir from the slide valve chamber and vent said reservoir, and when the graduating valve is in normal and the slide valve in abnormal position to open free communication between said slide valve chamber and said supplemental reservoir, and open a passage from the slide valve chamber to the brake pipe; secondary valve means controlling the last-named passage; a pressure motor connected to actuate said secondary valve means and subject to brake pipe pressure in a valve-opening direction and to supplemental reservoir pressure in a valve-closing direction; and a spring urging said secondary valve means in an opening direction.

20. In an automatic brake valve, the combination of a slide valve chamber, having a valve seat and adapted for connection with an auxiliary reservoir; a slide valve on said seat; a graduating valve; an actuating piston subject on one side to brake pipe pressure and on the other to pressure in the slide valve chamber, said piston being arranged to actuate said valves and having lost motion relatively to said slide valve; and a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; there being in said seat a quick service port leading from the brake pipe and a quick service port leading to a point of discharge, and ports in the slide valve controlled by the graduating valve, and serving in quick service position to connect said quick service ports together, and when the graduating valve is in normal and the slide valve in abnormal position to connect the first-named quick service port with the slide valve chamber.

21. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; and a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position, there being in said seat a quick service port leading from the brake pipe and a quick service port leading to a point of discharge, and ports in the slide valve controlled by the graduating valve, and serving in quick service position to connect said quick service ports together, and when the graduating valve is in normal and the slide valve in abnormal position to connect the first-named quick service port with the slide valve chamber; and secondary valve means responsive to brake pipe pressure and controlling the first-named quick service port.

22. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; and a supplemental reservoir; there being in said seat a quick service port leading from the brake pipe, a quick service port leading to a point of discharge, and a supplemental reservoir port to which the supplemental reservoir is connected, and there being ports in the slide valve controlled by the graduating valve, and serving in quick service position to connect said quick service ports together, serving when both valves are in normal position to establish restricted communication between the slide valve chamber and the supplemental reservoir port and serving when the graduating valve is in normal and the slide valve in abnormal position to establish free communication between the slide valve chamber and the supplemental reservoir port.

23. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; and a supplemental reservoir; there being in said seat a quick service port leading from the brake pipe, a quick service port leading to a point of discharge, and a supplemental reservoir port to which the supplemental reservoir is connected, and there being ports in the slide valve controlled by the graduating valve, and serving in quick service position to connect said quick service ports together, serving when both valves are in normal position to establish restricted communication between the slide valve chamber and the supplemental reservoir port and serving when the graduating valve is in normal and the slide valve in abnormal position to establish free communication between the slide valve chamber and the supplemental reservoir port, and communication between the slide valve chamber and the first-named quick service port.

24. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; a supplemental reservoir; there being in said seat a quick service port leading from the brake pipe, a quick service port leading to a point of discharge, and a supplemental reservoir port to which the supplemental reservoir is connected, and there being ports in the slide valve controlled by the graduating valve, and serving in quick service position to connect said quick service ports together, serving when both valves are in normal position to establish restricted communication between the slide valve chamber and the supplemental reservoir port and serving when the graduating valve is in normal and the slide valve in abnormal position to establish free communication between the slide valve chamber and the supplemental reservoir port, and communication between the slide valve chamber and the first-named quick service port; and secondary valve means subject to brake pipe pressure and controlling the first-named quick service port.

25. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; a supplemental reservoir; there being in said seat a quick service port leading from the brake pipe, a quick service port leading to a point of discharge, and a supplemental reservoir port to which the supplemental reservoir is connected, and there being ports in the slide valve controlled by the graduating valve, and serving in quick service position to connect said quick service ports together, serving when both valves are in normal position to establish restricted communication between the slide valve chamber and the supplemental reservoir port and serving when the graduating valve is in normal and the slide valve in abnormal position to establish free communication between the slide valve chamber and the supplemental reservoir port, and communication between the slide valve chamber and the first-named quick service port; a secondary valve controlling the first-named quick service port; a pressure motor connected to actuate said secondary valve and subject in a valve-opening direction to brake pipe pressure and in a valve-closing direction to supplemental reservoir pressure; and means for biasing said secondary valve in an opening direction.

26. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; a supplemental reservoir; there being in said seat a quick service port leading from the brake pipe, a quick service port leading to a point of discharge, and a supplemental reservoir port to which the supplemental reservoir is connected, and there being ports in the slide valve controlled by the graduating valve, and serving in quick service position to connect said quick service ports together, serving when both valves are in normal position to establish restricted communication between the slide valve chamber and the supplemental reservoir port and serving when the graduating valve is in normal and the slide valve in abnormal position to establish free communication between the slide valve chamber and the supplemental reservoir port, and communication between the slide valve chamber and the first-named quick service port; a secondary valve controlling the first-named quick service port; a pressure motor connected to actuate said secondary valve and subject in a valve-opening direction to brake pipe pressure and in a valve-closing direction to supplemental reservoir pressure; and a spring urging said secondary valve in an opening direction.

27. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; and a supplemental reservoir; there being in said seat a quick service port leading from the brake pipe, a quick service port leading to a point of discharge, an exhaust port, and a supplemental reservoir port, and there being ports in the slide valve controlled by the graduating valve, serving in quick service position to connect said quick service ports together, serving when both valves are in normal position, to establish restricted communication between the slide valve chamber and supplemental reservoir port, serving when both valves are in abnormal position to isolate the supplemental reservoir port from the slide valve chamber and connect said port with said exhaust port, and serving when the graduating valve is in normal and the slide valve is in abnormal position to establish free communication between the slide valve chamber and the supplemental reservoir port.

28. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises normally to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; and a supplemental reservoir; there being in said seat a quick service port leading from the brake pipe, a quick service port leading to a point of discharge, an exhaust port, and a supplemental reservoir port, and there being ports in the slide valve controlled by the graduating valve, serving in quick service position to connect said quick service ports together, serving when both valves are in normal position, to establish restricted communication between the slide valve chamber and supplemental reservoir port, serving when both valves are in abnormal position to isolate the supplemental reservoir port from the slide valve chamber and connect said port with said exhaust port, and serving when the graduating valve is in normal and the slide valve is in abnormal position to establish free communication between the slide valve chamber and the supplemental reservoir port, and communication between the slide valve chamber and the first-named quick service port.

29. In a triple valve, the combination of a slide valve chamber, having a valve seat and adapted for connection with an auxiliary reservoir; a slide valve on said seat; a graduating valve; a triple piston subject on one side to brake pipe pressure and on the other to pressure in the slide valve chamber, said piston being arranged to actuate said valves and having lost motion relatively to said slide valve; a yielding retard stop reacting against motion of the piston and serving when brake pipe pressure rises to normal value to arrest the piston and both valves in normal position, but capable of yielding under abnormal rise of brake pipe pressure to permit the piston and both valves to move to abnormal position, and thereafter serving to shift the piston and graduating valve to normal position, the slide valve remaining in abnormal position; a supplemental reservoir; there being in said seat a quick service port leading from the brake pipe, a quick service port leading to a point of discharge, an exhaust port, and a supplemental reservoir port, and there being ports in the slide valve controlled by the graduating valve, serving in quick service position to connect said quick service ports together, serving when both valves are in normal position, to establish restricted communication between the slide valve chamber and supplemental reservoir port, serving when both valves are in abnormal position to isolate the supplemental reservoir port from the slide valve chamber and connect said port with said exhaust port, and serving when the graduating valve is in normal and the slide valve is in abnormal position to establish free communication between the slide valve chamber and the supplemental reservoir port, and communication between the slide valve chamber and the first-named quick service port; a secondary valve controlling the first-named quick service port; a pressure motor connected to actuate said secondary valve and subject in a valve-opening direction to brake pipe pressure and in a valve-closing direction to supplemental reservoir pressure; and means for biasing said secondary valve in an opening direction.

30. In a triple valve, the combination of a slide valve chamber having a valve seat and adapted for connection with an auxiliary reservoir; a slide valve on said seat; a graduating valve; a triple piston subject on one side to brake pipe pressure and on the other to pressure in said slide valve chamber, said piston being arranged to actuate said valves and having lost motion relatively to said slide valve; and a yielding retard stop reacting against motion of the piston and serving when brake pipe pressure rises normally in release, to arrest the piston and both valves in normal position, but capable of yielding to permit the piston, in response to abnormal rise of brake pipe pressure, to shift both valves to abnormal position, and thereafter serving to shift the piston and graduating valve to normal position, the slide valve remaining in abnormal position; there being a supplemental reservoir port in said slide valve seat; a pair of ports in the slide valve, the first of which registers with said seat port in the normal, and the second of which registers with said seat port in the abnormal position of the slide valve, and a pair of ports of different capacity in the graduating valve, the small capacity port registering with the first slide valve port when both valves are in normal position and the large capacity port registering with the second slide valve port when the graduating valve is in normal and the slide valve in abnormal position.

31. In a triple valve, the combination of a slide valve chamber having a valve seat and adapted for connection with an auxiliary reservoir; a slide valve on said seat; a graduating valve; a triple piston subject on one side to brake pipe pressure and on the other to pressure in said slide valve chamber, said piston being arranged to actuate said valves and having lost motion relatively to said slide valve; and a yielding retard stop reacting against motion of the piston and serving when brake pipe pressure rises normally in release, to arrest the piston and both valves in normal position, but capable of yielding to permit the piston, in response to abnormal rise of brake pipe pressure, to shift both valves to abnormal position, and thereafter serving to shift the piston and graduating valve to normal position, the slide valve remaining in abnormal position; there being a supplemental reservoir port in said slide valve seat and two ports in the slide valve which register with said seat port selectively in normal and abnormal positions of said slide valve, and two ports in the graduating valve which register in alternation with each other with corresponding ones of said slide valve ports at the limits of said lost motion of the slide valve, the two ports in one of said valves being of different flow capacities.

32. In a triple valve, the combination of a slide valve chamber having a valve seat and adapted for connection with an auxiliary reservoir; a slide valve on said seat; a graduating valve; a triple piston subject on one side to brake pipe pressure and on the other to pressure in said slide valve chamber, said piston being arranged to actuate said valves and having lost motion relatively to said slide valve; and a yielding retard stop reacting against motion of the piston and serving when brake pipe pressure rises normally in release, to arrest the piston and both valves in normal position, but capable of yielding to permit the piston, in response to abnormal rise of brake pipe pressure, to shift both valves to abnormal position, and thereafter serving to shift the piston and graduating valve to normal position, the slide valve remaining in abnormal position; there being a supplemental reservoir port in said slide valve seat and two ports in the slide valve which register with said seat port selectively in normal and abnormal positions of said slide valve, and two ports in the graduating valve which register in alternation with each other with corresponding ones of said slide valve ports at the limits of said lost motion of the slide valve, the two ports in the graduating valve being of different flow capacities.

33. In an automatic brake valve, the combination of an actuating piston having a normal recharge position and a restricted recharge position; a slide valve having a lost motion connection with said piston and having a normal release position and a restricted release position, and having ports for providing in said release positions connection between the auxiliary and a supplemental reservoir; a graduating valve controlling the last-named ports by motion relatively to the slide valve; and a yielding retard stop tending to arrest said piston and valves in position for normal release and recharge, but capable of yielding under excessive rise of brake pipe pressure to permit movement to position to restrict release and recharge, said retard stop serving to restore the piston and graduating valve to normal recharge position while the slide valve remains in restricted release position.

34. In an automatic brake valve, the combination of an actuating piston having a normal recharge position and a restricted recharge position; a slide valve having a lost motion connection with said piston and having a normal release position and a restricted release position, and having ports for providing in said release positions connection between the auxiliary and a supplemental reservoir; a graduating valve controlling the last-named ports by motion relatively to the slide valve; and a yielding retard stop tending to arrest said piston and valves in position for normal release and recharge, but capable of yielding under excessive rise of brake pipe pressure to permit movement to position to restrict release and recharge, said retard stop serving to restore the piston and graduating valve to normal recharge position while the slide valve remains in restricted release position, said graduating valve functioning in conjunction with the slide valve to establish restricted communication between said reservoirs in normal release and recharge position, and free communication between said reservoirs when the piston and graduating valve are in normal recharge position and the slide valve is in restricted release position.

35. In a triple valve, the combination of a triple piston having a normal recharge position and a restricted recharge position; a valve chamber provided with a valve seat having a stabilizing port and a supplemental reservoir port; a slide valve mounted on said seat and having a lost motion connection with said piston, and having a normal release position and a restricted release position, and having ports which in said release positions register selectively with said supplemental reservoir port, and a stabilizing port which in restricted release position registers with the stabilizing port in said seat; a graduating valve controlling the slide valve ports above named; and a yielding retard stop tending to arrest said piston and valves in normal release and recharge position, but capable of yielding under excessive rise of brake pipe pressure to permit movement of the piston and valves to restricted release and recharge position, said retard stop serving to restore the piston and graduating valve to normal recharge position while the slide valve remains in restricted release position, said graduating valve functioning in conjunction with the slide valve to establish restricted communication between the slide valve chamber and the supplemental reservoir port in normal release and recharge position and free communication between said chamber and port, and communication between said chamber and stabilizing port when the piston and graduating valve are in normal recharge position, and the slide valve is in restricted release position.

36. In a triple valve, the combination of a triple piston having a normal recharge position and a restricted recharge position; a slide valve having a lost motion connection with said piston and having a normal release position and a restricted release position, and having ports for providing in said release positions connection between the auxiliary and a supplemental reservoir; a graduating valve controlling the last-named ports by motion relatively to the slide valve; and a yielding retard stop tending to arrest said piston and valves in position for normal release and recharge, but capable of yielding under excessive rise of brake pipe pressure to permit movement to position to restrict release and recharge, said retard stop serving to restore the piston and graduating valve to normal recharge position while the slide valve remains in restricted release position, said graduating valve functioning in conjunction with the slide valve to establish restricted communication between said reservoirs in normal release and recharge position, and free communication between said reservoirs when the piston and graduating valve are in normal recharge position and the slide valve is in restricted release position, and to vent the supplemental reservoir in restricted release and recharge position.

37. In a triple valve, the combination of a triple piston having a normal recharge position and a restricted recharge position; a slide valve chamber having a seat provided with a stabilizing port leading to the brake pipe, a supplemental reservoir port and an exhaust port; a slide valve movable on said seat and having a normal release position and restricted release position, said slide valve being provided with ports which in said release positions register selectively with said supplemental reservoir port, and with a stabilizing port which in restricted release position registers with the stabilizing port in said seat; a graduating valve controlling the above named ports in the slide valve; a yielding retard stop tending to arrest said piston and valves in normal release and recharge position, but capable of yielding under excessive rise of brake pipe pressure to permit motion to restricted recharge and release position, said retard stop serving to restore the piston and graduating valve to normal recharge position while the slide valve remains in restricted release position, said graduating valve functioning in conjunction with the slide valve to establish restricted communication between the slide valve chamber and said supplemental reservoir port in normal release and recharge position, and when the piston and graduating valve are in normal recharge position and slide valve is in restricted release position to establish free communication from said reservoir port to the slide valve chamber and communication between the slide valve chamber and said stabilizing port, and in restricted recharge and release position to connect said supplemental reservoir port with said exhaust port.

38. In a triple valve, the combination of a triple piston having a normal recharge position and a restricted recharge position; a valve chamber provided with a valve seat having a stabilizing port and a supplemental reservoir port; a slide valve mounted on said seat and having a lost motion connection with said piston, and having a normal release position and a restricted release position, and having ports which in said release positions register selectively with said supplemental reservoir port, and a stabilizing port which in restricted release position registers with the stabilizing port in said seat; a graduating valve controlling the slide valve ports above named; and a yielding retard stop tending to arrest said piston and valves in normal release and recharge position, but capable of yielding under excessive rise of brake pipe pressure to permit movement of the piston and valves to restricted release and recharge position, said retard stop serving to restore the piston and graduating valve to normal recharge position while the slide valve remains in restricted release position, said graduating valve functioning in conjunction with the slide valve to establish restricted communication between the slide valve chamber and the supplemental reservoir port in normal release and recharge position and free communication between said chamber and port, and communication between said chamber and stabilizing port when the piston and graduating valve are in normal recharge position, and the slide valve is in restricted release position; and means responsive to the initial portion of a brake pipe pressure reduction for closing said stabilizing port when said pressure has been reduced a given amount.

39. An automatic brake valve of the equalizing type adapted for connection with a brake pipe, brake cylinder and auxiliary reservoir, and having a plurality of release positions, said valve including a passage additional to the reservoir charging passage, connecting the brake pipe and auxiliary reservoir, and opened in one of said release positions only.

40. An automatic brake valve of the equalizing type adapted for connection with a brake pipe, brake cylinder and auxiliary reservoir, and having a normal recharge position, a restricted recharge position and a normal recharge position to which the valve moves from restricted recharge position, said valve including a passage additional to the charging passage, and open in the last named normal recharge position only, to connect the brake pipe and auxiliary reservoir.

41. An automatic brake valve of the equalizing type adapted for connection with a brake pipe, brake cylinder and auxiliary reservoir, and having three release and recharge positions, the first of which is initially assumed by triple valves adjacent the engineer's brake valve, the second of which is assumed by the remaining valves in the train, and the third of which is subsequently assumed by those valves which move to the first release position, said valves including stabilizing ports distinct from the reservoir charging passage and opened by motion of the valves to said third position to connect the brake pipe and auxiliary reservoir.

42. The combination with an automatic brake valve, as defined in claim 41, of valve means independent of such automatic valve, controlling flow through said stabilizing ports, subject to brake pipe pressure and arranged to close upon a definite reduction of brake pipe pressure.

43. In a triple valve adapted for connection with a brake pipe, brake cylinder, and auxiliary reservoir, the combination of a valve unit comprising a triple piston, triple slide valve and graduating valve, the triple piston controlling a reservoir charging port, the slide valve controlling release of the brakes, and the triple slide and graduating valve conjointly controlling flow from the auxiliary reservoir to the brake cylinder, the triple piston actuating said valves and having lost motion relatively to one of said valves; and a yielding retard stop reacting against the triple piston in release position, said valve unit including a port controlled by said valves and opened upon motion of said piston against the resistance of said retard stop and back under the urge of said retard stop, to connect said reservoir and brake pipe independently of said reservoir charging port.

44. The combination of a brake pipe; a brake cylinder; an auxiliary reservoir; a supplemental reservoir; and a triple valve, said triple valve including a triple piston, triple slide valve actuated thereby, yielding retard stop, and a slide valve chamber connected with the auxiliary reservoir and having a slide valve seat, there being in the seat an exhaust port, a brake cylinder port and a supplemental reservoir port, and there being in the slide valve ports which connect the brake cylinder and exhaust ports without or with the interposition of a flow-retarding constriction according as the triple piston is arrested by or overpowers said retard stop, and a port which connects the supplemental reservoir port with said exhaust port beyond said constriction when the piston overpowers the retard stop.

45. The combination of a brake pipe; a brake cylinder; an auxiliary reservoir; a supplemental reservoir; and a triple valve, said triple valve including a triple piston, a triple slide valve having lost motion relatively thereto, a graduating valve actuated by the triple piston, a retard stop reacting against the triple piston to resist motion from normal to restricted release and recharge positions, and a slide valve chamber connected with the auxiliary reservoir and having a slide valve seat, there being in the seat an exhaust port, a brake cylinder port, and a supplemental reservoir port, there being in the slide valve ports which connect the brake cylinder and exhaust ports without or with the interposition of a flow-retarding constriction according as the triple piston is arrested by or overpowers said retard stop, and there being in the slide and graduating valves coacting ports which connect the supplemental reservoir port with said exhaust port beyond said constriction while the piston overpowers the retard stop.

46. The combination with an automatic brake valve of the equalizing type having a normal recharge position in which charging occurs around the rim of the actuating piston and a restricted recharge position in which such charging flow is restricted at a point spaced from the rim of the piston, of means for partially restricting charging flow by the initial motion toward restricted recharge position, said means comprising a pair of ports through which, in parallel, the charging flow normally occurs, one of said ports being so located as to be blanked by said piston in such initial motion.

47. The structure of claim 46, further characterized in that the charging flow is normally to an auxiliary and a supplemental reservoir, and the automatic valve acts to cut off the flow to the supplemental reservoir as the valve starts to restricted recharge position, the ratio of the flow capacity of the port which is blanked by the piston to the flow capacity of the other port approximating the ratio of volumes of the supplemental and auxiliary reservoirs.

48. A brake valve mechanism comprising in combination a body adapted for connection with a brake pipe and a reservoir; an abutment in said body arranged to be actuated by the pressure differential between brake pipe and reservoir; and valve means arranged to be actuated by said abutment and controlling the sensitiveness of said abutment to reductions of brake pipe pressure from the normal running pressure, said valve means being set by a temporary excessive rise of brake pipe pressure to reduce such sensitiveness.

49. A brake valve mechanism comprising in combination a body adapted for connection with a brake pipe and a reservoir; an abutment in said body arranged to be actuated by the pressure differential between brake pipe and reservoir; and means operatively associated with said abutment, and arranged to afford normal communication between the brake pipe and reservoir when brake pipe pressure rises normally, and an increased communication when brake pipe pressure returns to normal after rising abnormally high.

50. A brake valve mechanism comprising in combination a body adapted for connection with a brake pipe and a reservoir; an abutment in said body arranged to be actuated by the pressure differential between brake pipe and reservoir; and means operatively associated with said abutment, and arranged to afford normal communication between the brake pipe and reservoir when brake pipe pressure rises normally, a more restricted communication when brake pipe pressure rises abnormally high, and a more free than normal communication when brake pipe pressure falls from an abnormally high to normal pressure.

CHARLES A. CAMPBELL.